Dec. 6, 1960  L. I. KNUDSON ET AL  2,963,620
SENSING IGNITER
Filed Aug. 27, 1959  3 Sheets-Sheet 1
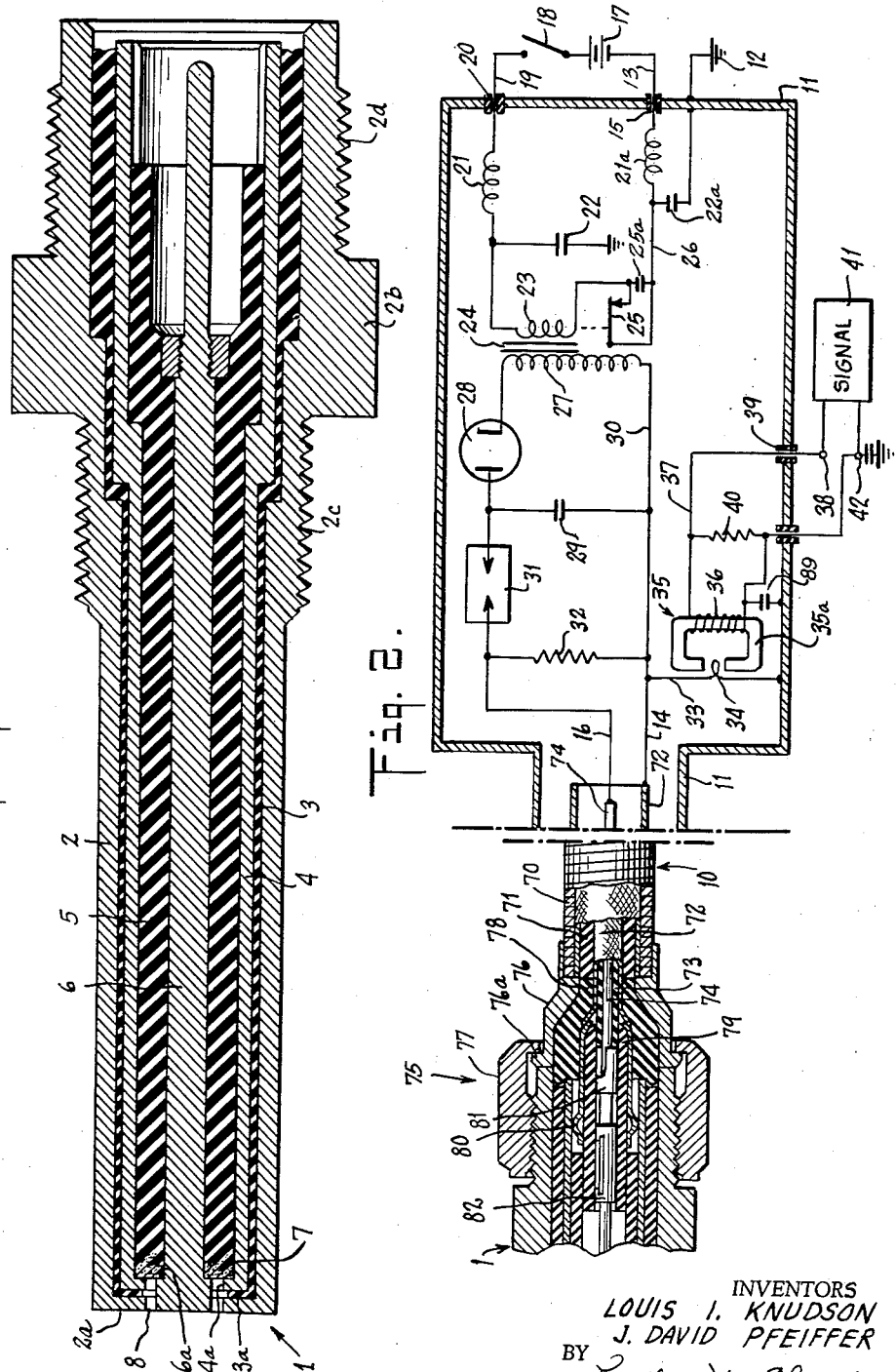
INVENTORS
LOUIS I. KNUDSON
J. DAVID PFEIFFER
BY Lester N. Clark
ATTORNEY Dec. 6, 1960
L. I. KNUDSON ET AL
2,963,620
SENSING IGNITER
Filed Aug. 27, 1959
3 Sheets-Sheet 2
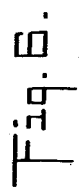
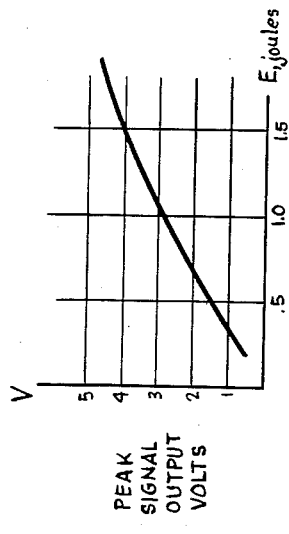
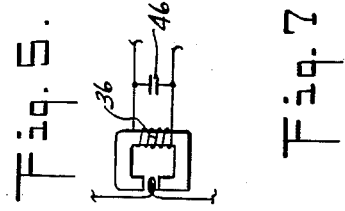
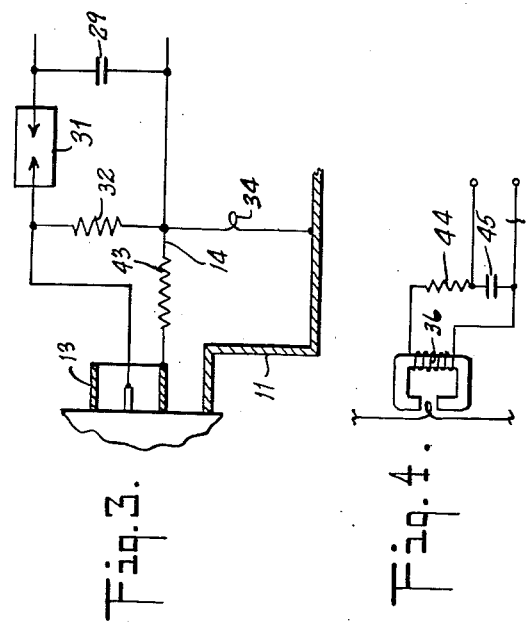
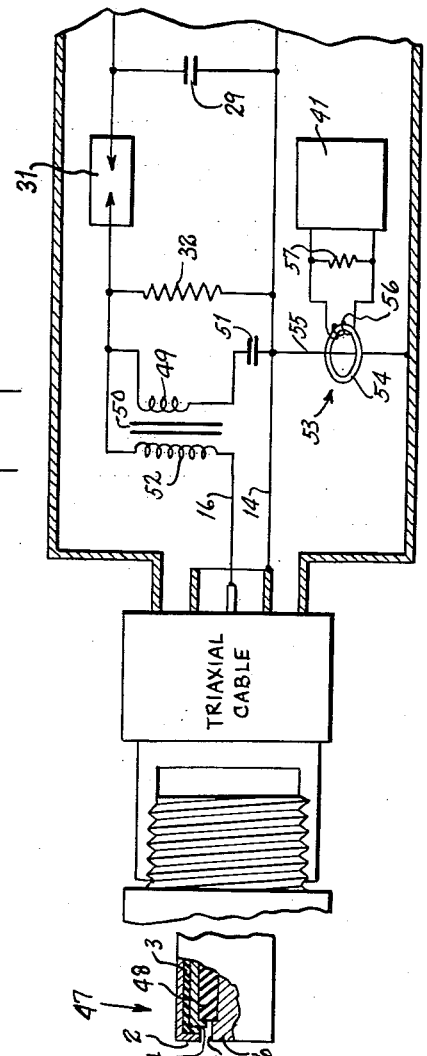
INVENTORS
LOUIS I. KNUDSON
J. DAVID PFEIFFER
BY
Lester N. Clark
ATTORNEY INVENTORS
LOUIS I. KNUDSON
J. DAVID PFEIFFER
BY Lester H. Clark
ATTORNEY United States Patent Office 2,963,620
Patented Dec. 6, 1960

2,963,620

SENSING IGNITER

Louis I. Knudson and John David Pfeiffer, Norwich, N.Y., assignors to General Laboratory Associates, Inc., Chenango, N.Y., a corporation of New York Filed Aug. 27, 1959, Ser. No. 836,547

19 Claims. (Cl. 315—35)

This invention relates to signal or control apparatus generally and particularly to sensing igniters, that is to say, igniters provided with means for sensing the presence of a spark at the igniter and either actuating a signal or performing a control function in response to the spark.

In modern jet and rocket engines, it is desirable in many cases for the person in control of the engine to know whether an igniter is functioning properly. In order to make such a determination, it has been proposed to provide a sensing electrode projecting into the space between the two conventional sparking electrodes at a locality where a spark appears when the igniter is working properly. The appearance of a spark impinging on such a sensing electrode is accompanied by a potential between that electrode and one of the conventional sparking electrodes of the igniter gap. Such a potential may be amplified to produce the required signal or control effect.

A sensing device such as that just described has several limitations. One of the most serious limitations is that the spark may move between the sparking electrodes along a path different from that expected when the location of the sensing electrode was determined, in which case the spark may appear at the igniter without the production of any signal. The absence of a signal at such a time indicates to the operator that the igniter is not working, when in fact it is working.

Another difficulty which occurs with such devices is that an insulation failure in the conductor connected to the sensing electrode may produce a false indication that the igniter is functioning properly when in fact it is not, especially if a biasing potential is used on the sensing electrode.

An object of the invention is to provide an improved sensing igniter.

Another object is to provide improved signalling or control apparatus including such an igniter and improved circuits connecting the igniter to a visible or other sensible signal or control device.

Another object is to provide an improved remote control system for connecting a control station to a remotely located sensing device, e.g., a sensing igniter, in which the system fails safe, i.e., all the more probable sources of failure such as an insulation failure or an open circuit in the connections between the stations, produce a condition in which no signal is received at the control station.

The foregoing and other objects of the invention are attained in the apparatus described herein by providing a sensing igniter including a gap defined by two concentric cylindrical igniter electrodes, the gap being closed at one end either by an insulator or a semiconductor. Adjacent the open end of the gap is provided a third sensing electrode which completely encircles the cylindrical gap. Any spark occurring between the igniter electrodes tends to "blossom" and move out through the open end of the gap. As it moves through the open end, the spark impinges on the sensing electrode and a part of the spark current flows through a low impedance circuit connected between the sensing electrode and the outer one of the two concentric electrodes. The current flowing through this low impedance circuit is utilized to induce a magnetic flux in the core of a current transformer having a secondary winding and located at a control station remote from the sensing station at the igniter. The secondary winding is connected to the input terminals of a signal or control device.

The outer or sensing electrode is operated at ground potential. The outer one of the two igniter electrodes has a maximum potential which is relatively close to ground as compared to the center electrode, since it is connected to ground through a low impedance circuit branch. The two igniter electrodes and the sensing electrode, all located at the sensing station, are connected to the spark supply apparatus, located at the control station, through a triaxial cable, the outer conductor of which is grounded and electrically connected to the housing of the ignition current supply apparatus. Any conductor or insulation failure involving the two inner conductors in the triaxial cable will prevent energy from reaching the current transformer, so that no output signal will be produced. This triaxial arrangement of the conductors is of substantial utility from the standpoint of "fail safe" operation in signalling and control systems generally.

It has been found that by suitably constructing the load on the secondary of the current transformer, a circuit may be provided in which the peak signal output voltage from the current transformer may be taken as an approximate measure of the energy of the spark at the igniter. Such an arrangement is useful in many instances, as in test installations or in determining that the spark energy is sufficient to ignite the fuel.

Other objects and advantages of the invention will become apparent from a consideration of the following specification and claims, taken together with the accompanying drawings, in which:

Fig. 1 is a cross-sectional view on an enlarged scale, of a sensing igniter embodying certain features of the present invention;

Fig. 2 is a somewhat diagrammatic illustration of the igniter of Fig. 1 connected to an ignition supply and sensing circuit;

Figs. 3, 4 and 5 are fragmentary wiring diagrams showing modifications of the circuit of Fig. 2;

Fig. 6 is a graphical illustration of the relationship between the spark energy and the peak output signal voltage in the circuit of Fig. 2;

Fig. 7 is a view similar to Fig. 2, showing a modified form of ignition energy supply circuit as used in air gap igniters as contrasted to the semi-conductor surface gap igniters of Figs. 1 and 2;

FIG. 1

Figure 8:
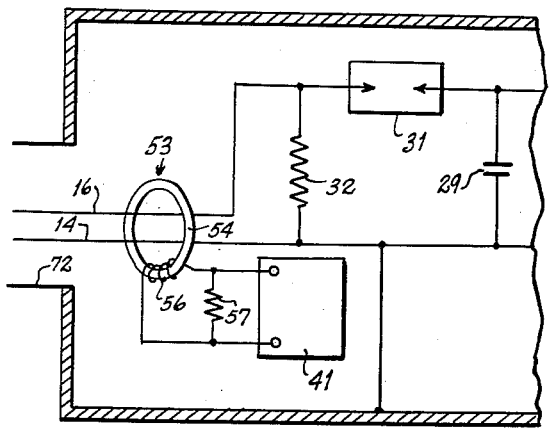
Fig. 8 is a fragmentary view similar to Fig. 2, showing a modification.

There is shown in this figure an igniter generally indicated by the reference numeral 1 and including an outer cylindrical shell 2, sometimes hereinafter termed a sensing electrode, which is hollow throughout its length. An insulator 3, preferably of ceramic, fire-resistant material, is concentric with the shell 2 and extends substantially throughout the length thereof. A sparking electrode 4 is in the form of a hollow cylindrical tube and is concentric with and just inside the insulator 3. Another insulator 5, also in the form of a hollow cylindrical tube, preferably of ceramic, fire-resistant material, is located just inside and concentric with the sparking electrode 4. A second sparking electrode 6 is in the form of a rod running axially of the igniter 1 from one end to the other.

The left-hand end of the insulator 5, as it appears in the drawing, is impregnated with semiconductor material, as shown at 7. This impregnation may be accomplished, for example, by means of the process described and claimed in the patent to Shay J. Sheheen, No. 2,861,014, granted November 18, 1958.

The center electrode 6 is provided near its left-hand or outer end with a peripheral flange or shoulder 6a which abuts against the semiconductor surface 7. The sparking electrode 4 has at its left-hand end an inwardly directed flange 4a which abuts against the semiconductor surface 7 and faces the electrode 6 across an air gap 8 of annular cross-section.

The left-hand end of the insulator 3 is provided with an inwardly directed flange 3a which abuts against the left-hand end of the electrode 4. The outer shell or sensing electrode 2 is provided at its left-hand end with an inwardly directed flange 2a which abuts against the insulator flange 3a and has its inner periphery facing the center electrode 6 across the spark gap 8.

The flanges 2a, 4a and 6a are provided to make the width of the spark gap less than the thickness of insulator 5.

The outer shell 2 is provided with a flange 2b which may be knurled or provided with flats for the application of a wrench. Just to the left of the flange 2b, as it appears in Fig. 1, is a threaded portion 2c which may be received in an internally threaded hole in a combustion chamber or the like where ignition is to be provided. Just to the right of the flange 2b is another threaded portion 2d, which is adapted for attachment to a triaxial electrical connector generally indicated at 75, and attached to a triaxial cable 10 (see Fig. 2).

FIG. 2

The triaxial cable 10 includes an outer conductive sheath 70 which may be of stainless steel helical convolutions enclosing an inner layer of copper braid; an insulating sheath 71, just inside the conductive sheath; a second layer of metal braid 72, which serves as the intermediate conductor of the cable; another insulating layer 73, and an axial conductor 74. It is desirable that the resistivity of sheath 70 be lower than the resistivity of a conductor 72.

The cable 10 is adapted to engage the end of the igniter plug 1 by means of a connector 75, so that the three conductors 70, 72 and 74 of the cable are electrically connected to the conductors 2, 4 and 6. The connector 75 includes a ferrule 76 having one end soldered to the end of the sheath 70, and flaring outwardly therefrom to an outer flanged end 76a adapted to engage an inwardly projecting flange on a nut 77, threaded internally to engage the thread 2d on the igniter 1. A grommet 78, of insulating material, has one end closely fitting the end of the insulating sheath 71, and is flared outwardly to receive an insulating sleeve 79 and a plurality of spring fingers 80 clamped between the sleeve 79 and the grommet 78. The spring fingers are soldered at their right hand ends to the metal braid 72. Their left hand ends are adapted to engage the inside of the tube (sparking electrode) 4 and complete an electrical connection between tube 4 and braid 72. Inside the sleeve 79, the end of the wire 74 is soldered to a coupling 81 including a spring socket 82 of conventional construction and adapted to receive the pin formed on the right hand end of the rod 6.

The shell 2 is in electrical contact with the outer sheath 70 of the triaxial cable 10, and the opposite end of sheath 70 is connected to a metallic housing 11, grounded as shown at 12. A second connector (not shown) generally similar to connector 75, may be provided at the other end of the cable 10. The electrode 4 is in electrical contact with the intermediate conductor 72, the opposite end of which is connected, inside the casing 11, to a wire 14. The center electrode 6 is in electrical contact with the axial conductor 74, the opposite end of which is connected, inside the casing 11, to a wire 16. The wires 14 and 16 are connected to an ignition energy supply circuit which may be of a generally conventional type, except that in the conventional type, the wire 14 is usually grounded.

Electrical energy for the ignition circuit is supplied from a battery 17 located outside the casing 11. The positive terminal of battery 17 is connected through a switch 18 to a wire which extends through an insulating bushing 20 into the interior of the casing 11. The negative terminal of battery 17 is connected to a wire 13, which extends through an insulating bushing 15 into the interior of the grounded casing 11.

Inside the casing 11, the wire 19 is connected through a filter which includes an inductor 21 and a grounded capacitor 22 to the primary winding 23 of a vibrator type D.C.-A.C. converter 24. Wire 13 is similarly connected through a filter including an inductor 21a and a grounded capacitor 22a to a wire 26. A vibrating contact 25, operated by energization of winding 23, is connected in series between that winding and wire 26. A spark quenching capacitor 25a is connected across the contact 25.

The converter 24 has a secondary winding 27 having its upper terminal connected through a diode 28 to the upper terminal of a main ignition supply capacitor 29. The lower terminal of winding 27 is connected to the lower terminal of capacitor 29 through a wire 30. The upper terminal of capacitor 29 is connected through a sealed trigger gap 31 to wire 16 and thence to axial conductor 74 of the triaxial cable 10 and the center electrode 6 of the igniter 1. Wire 30 is connected to wire 14 and thence to the intermediate conductor 72 of the cable 10 and the annular igniter electrode 4 of the igniter 1. A resistor 32 is connected between the wires 14 and 16. This resistor may have a value in the range from 500 to 1000 ohms and is provided for safety purposes to discharge any potential which may build up on wire 16 in the event that the cable is disconnected. The resistor 32 also helps to stabilize the breakdown potential of the gap 31.

Wire 14 is connected through a wire 33 and a single turn primary winding 34 of a current transformer 35 to the grounded casing 11. Transformer 35 is constructed so as to make it difficult to saturate. As illustrated, an air gap in the transformer may be used for this purpose. Alternatively, a closed core may be used with a low resistance load on the secondary, to achieve the same end. The transformer 35 has a secondary winding 36 having its lower terminal connected to the grounded casing 11 through an isolating capacitor 89 and its upper terminal connected through a wire 37 to a signal output terminal 38. The wire 37 extends through an insulating bushing 39 to the outside of the casing. A resistor 40, which may have a resistance of 0.01 to 10 ohms, is connected across the secondary winding 36. Any suitable signalling device or control apparatus 41 has an input connected between the signal output terminal 38 and a grounded terminal 42. The signal apparatus 41 may include an amplifier. The signal may be obtained either by a visual signal device such as a lamp, a measuring device such as an oscillograph, or some other sensible signal element such as a buzzer. Any suitable control device, e.g., a relay, may alternatively be used.

Figure 9:
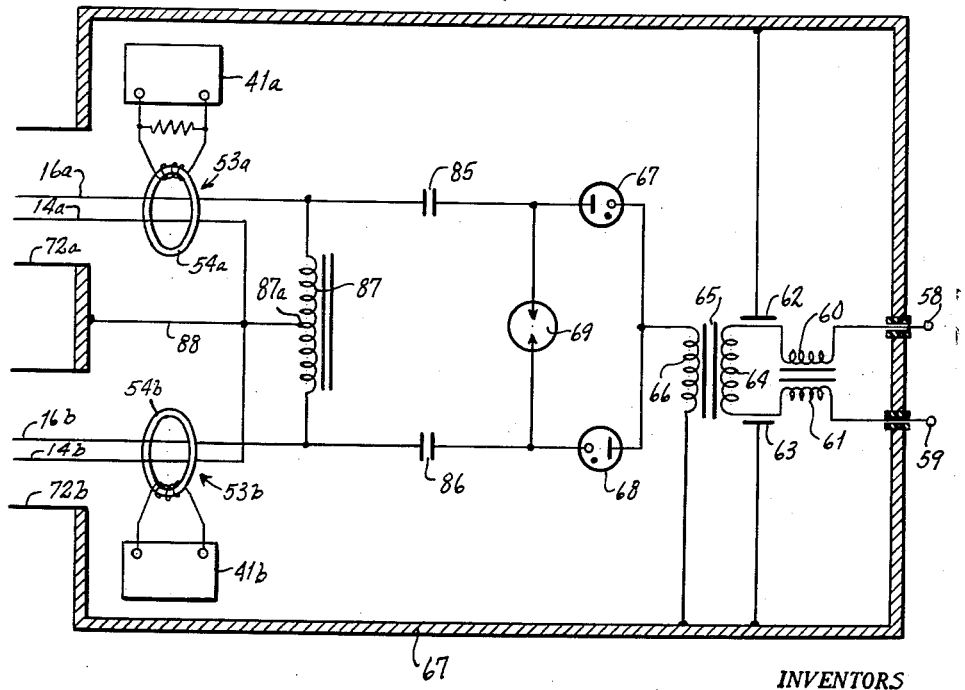
Fig. 9 is a view similar to Fig. 2, showing a modified arrangement for energizing two igniter plugs.

While a single turn winding is shown for primary 34, other equivalent arrangements may be used, for instance, a closed ring core might be used through which extended a straight wire (sometimes called a half-turn winding) carrying the current to be measured, the core carrying a secondary winding having a low resistance to which the signal would be attached. This and many other modifications could be used, some of which are illustrated in Figs. 7 to 9, below. It is essential only that the current flowing through the grounded conductor induce a magnetic flux in the transformer core.

*Operation of Figs. 1 and 2*

The operation of the ignition energy supply circuit will first be described and then the operation of the ignition sensing circuit.

Electrical energy is supplied by battery 17, converted into alternating current by the inverter 24 and stepped up in potential, rectified by diode 28 and used to charge the capacitor 29. The potential on capacitor 29 gradually builds up as it receives charges on the successive alternating cycles. When it reaches the breakdown voltage of the sealed gap 31, the capacitor 29 discharges through that gap and the gap 8 on the igniter 1, the two gaps being in series to the capacitor discharge current. Note that resistor 32 is in parallel with the igniter gap 8 to this current, although resistor 32 carries only from 0.002 to 0.0001 of the current in the gap 8. The cycle then repeats, sparks being produced at the gap 8 with a frequency determined by the time required to build up a charge on capacitor 29 to a potential greater than the breakdown potential of the gap 31.

When a spark occurs between the center electrode 6 and the intermediate electrode 4 at the gap 8, the spark initially forms along the semiconductor surface 7. As the capacitor discharges, a substantial proportion of its energy is dissipated in the spark at the gap 8 and the spark is said to blossom.

This "blossoming" of the spark is due in part to electromagnetic repulsion of the electrically charged plasma of the spark by the magnetic field of the current which supplies the spark energy, and in part to the expansion of the air (or other gas or vapor) trapped in the closed end of the gap, when that air is heated by the spark.

In other words, the volume of the spark increases and it moves outwardly through the gap 8. During ignition, the potential difference between the sensing electrode 2 and the intermediate electrode 4 at the gap 8 is rather small as compared to the potential difference between the center electrode 6 and either of the electrodes 2 and 4. Consequently, as the spark moves out through the gap 8, part of it transfers to the sensing electrode 2 and part of the spark current returns along a path through the sensing electrode 2, the outer conductor 70 of the triaxial cable 10, wire 33 and the primary winding 34 of current transformer 35 to the lower terminal of capacitor 29.

This current is of very short duration, but of substantial magnitude, being of the order of hundreds of amperes. Such a current flowing through the primary winding 34 induces a substantial potential in the secondary winding 36 which is fed to the signal or control apparatus 41.

The transformer 35 has a core 35a with an air gap, as shown, to prevent the core from saturating in response to the heavy current flowing through it. It is found that by using a core with an air gap, the potential at the secondary winding terminals follows more closely the variation of current flow in the primary winding. An alternative to the air gap core is illustrated below in connection with Figs. 7, 8 and 9.

It has been found that by connecting the resistor 40, having a value in the neighborhood of about 0.01 to 10 ohms, across the secondary winding 36, an approximately straight line relationship can be obtained between E, the energy dissipated in the spark and the V, the potential of the peak signal output across the secondary winding 36. Such a relationship is illustrated in Fig. 6. This is, of course, an approximation, but the results are close enough for most practical purposes.

Any insulation failure or short circuit between the conductors 16 and 14 or between the comparable conductors 74 and 72 in the cable, or the electrodes 6 and 4 in the igniter, cannot cause a current flow through the current transformer winding 34 sufficient to produce a spark indicating signal in the signal apparatus 41. Similarly, any insulation failure between the conductors 72 and 14 and the outer conductor of the triaxial cable will short the primary winding 34, so that insufficient current will flow there to produce a spark indicating signal. Any opening of the circuit in the wire 16 or the conductor immediately connected thereto will prevent any spark discharge at the igniter 8 and will therefore prevent any current flow through the primary winding 34. If the conductor path including the sensing electrode 2 and the outer conductor of the triaxial cable 10 is interrupted, current cannot flow through the primary winding 34, and no output signal can be produced. This latter condition is almost impossible to achieve physically. It may thus be seen that the circuit disclosed fails safe with respect to all of the more probable short circuit or open circuit failures, and at least some of the less probable failures.

The triaxial arrangement of the conductors between the power supply (capacitor 29), the load (gap 8), the sensing device (electrode flange 2a) and the signal translating device (winding 34), is of substantial value in other remote signalling or control systems involving the use of other load devices and other sensing mechanisms. For example, the load device may be a relay winding and the sensing mechanism may be a contact operated by the relay. The fail-safe features of the triaxial conductors are effective in any such system.

By virtue of the cylindrical contour of the gap 8, and the fact that it is completely encircled by the sensing electrode 2, the operation of the signal system cannot be adversely affected by the position in the gap where the spark forms. Regardless of the particular locality on the periphery of the gap 8 where the spark forms, it must, as it blossoms, move opposite a portion of the sensing electrode 2 and must thereby produce a signal at the device 41.

FIG. 3

This figure illustrates a modification of the circuit of Fig. 2, in which a resistor 43 is connected in series with the wire 14, and between it and the intermediate conductor 13 of the coaxial cable. The purpose of the resistor 43 is to make the potential difference between the center electrode 6 and the sensing electrode 2 greater than the potential difference between the electrode 6 and the spark electrode 4. The spark therefore has an increased tendency to move to the sensing electrode after it has been initiated to the point where current is flowing. Consequently, for a given spark current, the signal current through the primary winding 34 is increased by the use of resistor 43. The resistance of resistor 43 must be selected so that the breakdown potential between conductors of the triaxial cable is not exceeded. A resistance of 0.001 to 0.1 ohm has proven satisfactory. This resistance may be incorporated in the cable 10 by proper selection of the resistivities of the conductive materials used therein.

FIG. 4

This figure illustrates a modified load which may be applied to the secondary winding 36 in place of the resistor 40 of Fig. 2. This load consists of a resistor 44 and a capacitor 45 in series. The signal output is taken across capacitor 45. The resistor 44 may have a resistance of 270 ohms while the capacitor 45 may have a capacitance of 6000 mmf. This resistance and capacitance combination has an effect of integrating the transformer output potential so that the signal output across the condenser is a measure of the primary current.

FIG. 5

In this circuit the resistor 40 of Fig. 2 has been replaced by a capacitor 46 having a capacitance of 6000 mmf. This circuit does not integrate the potential appearing at the terminals of the secondary winding 36. The capacitor 46 resonates with the secondary winding 36 to produce a high amplitude output signal, without amplification. This signal indicates the presence of current in the primary winding 34, but does not provide a measure of the magnitude of that current. In those cases where the signal device 41 is a simple signal or control device and no indication of energy is required, the circuit of Fig. 5 may be preferred to that of Fig. 2.

FIG. 7

This figure illustrates a modification of the invention which is suitable for use with a jump gap igniter as opposed to the surface gap igniter of Figs. 1 and 2. The igniter 47 of Fig. 7 is the same as the igniter 1 of Figs. 1 and 2, except that the insulator 48 which replaces the insulator 5 of Fig. 1 has no semiconductor material on its end surface.

The circuit for supplying ignition energy to the igniter gap 8 is changed to correspond to the higher breakdown potential of the jump gap. The ignition supply circuit illustrated in Fig. 7 is conventional for that purpose. It differs from the circuit of Fig. 2 by having the primary winding 49 of a transformer 50 connected in series with a capacitor 51 across the terminals of the resistor 32. The transformer 50 has a secondary winding 52 connected in series between the trigger gap 31 and the center conductor 16 of the triaxial cable.

The current transformer 35 of Fig. 1 is replaced in Fig. 7 by a somewhat different current transformer 53 having a closed ring core 54 through which extends a straight wire 55 (sometimes called a half-turn winding) carrying the current to be measured. The core 54 carries a secondary winding 56 having a low resistance 57 (in the range from 0.01 ohm to 10 ohms—3.3 ohms is presently preferred). The signal device, control device, or other apparatus to be operated is generally indicated at 41 and is connected across the resistor 57.

When the trigger gap 31 breaks down, a current flows from capacitor 29 through gap 31, and primary winding 49, charging the trigger capacitor 51. This current induces a high voltage in the secondary winding 52 which is effective to break down the main spark gap 8. Once the main gap is broken down, the capacitors 29 and 51 discharge directly through primary winding 52.

In the current transformer 53, the resistive load 57 is designed to give sufficient current in the secondary winding to balance the magnetic field of the primary, thereby keeping the magnetization of the core 54 low and out of saturation.

It is not necessary for all purposes that the transformer be kept out of saturation. For example, if the only response required is a signal that turns "on" or "off," satisfactory operation may be secured even though the transformer saturates.

FIG. 8

This figure illustrates a modification of the circuit of Fig. 2, wherein a transformer 53 of the type described in Fig. 7 is used, with a somewhat different primary winding arrangement. Instead of having the core 54 encircling a wire 55 between the grounded conductor and the intermediate wire 14 of the triaxial cable, as in Fig. 7, the core 54 encircles both the axial wire 16 and the intermediate wire 14. The spark current flowing in the wires 16 and 14 flows in opposite directions in the two wires. As long as these currents are equal, their magnetic fields will balance and induce no magnetic flux in the core 54. However, when a current flows in the grounded outer conductor 72, that current is necessarily subtracted from the current in either wire 16 or wire 14, so that the magnetic fields due to currents in those two wires are then unbalanced, resulting in induction of a magnetic flux in the core 54 and the appearance of a signal at the device 41.

FIG. 9

This figure illustrates a modified form of ignition supply system for supplying two igniter electrodes from a single source of ignition current, wherein both igniter electrodes are provided with ignition sensing apparatus in accordance with the present invention.

In Fig. 9, power input terminals 58 and 59 are connected to a suitable source of alternating current supply, which may be for example, 400 cycles. These terminals are connected through windings 60 and 61 of a choke coil and feed-through capacitors 62 and 63 respectively to the opposite terminals of a transformer primary winding 64. The choke coils 60 and 61 and capacitors 62 and 63 prevent high frequency components of the ignition supply from reaching the external circuits. The primary winding 64 is part of a transformer 65 having a secondary winding 66. One terminal of winding 66 is connected to the grounded casing 67. The opposite terminal of secondary winding 66 is connected through oppositely poled diodes 67 and 68 to the opposite terminals of a trigger gap 69 corresponding functionally to the trigger gap 31 of the previous figures. The upper terminal of trigger gap 69 is connected to a capacitor 85, whose opposite terminal is connected to the center wire 16a of a triaxial cable leading to one of the two sensing igniters of this system. The lower terminal of trigger gap 69 is connected through a capacitor 86 to the center wire 16b of a triaxial cable leading to the other of the two sensing igniters. A load balancing choke coil 87 is connected between the wires 16a and 16b and has a center tap 87a connected to intermediate wires 14a and 14b in the respective triaxial cables and also connected to the grounded casing 67 through a wire 88. The outside conductors 72a and 72b of the triaxial cables are also connected to the grounded casing 67.

Two current transformers 53a, 53b are provided. Core 54a of transformer 53a encircles the wires 16a and 14a, whereas core 54b of transformer 53b encircles the wires 16b and 14b.

The capacitors 85 and 86 are charged by the current flowing through secondary winding 66, through the rectifying diodes 67 and 68. When the sum of the potentials across the two capacitors is sufficient, the gap 69 breaks down, and both capacitors discharge through their respective sensing igniters. The occurrence of sparks at the igniters is indicated by the devices 41a and 41b, as in the apparatus of Fig. 8. The load balancing choke coil 87 is provided so that if one of the igniters fails for any reason, the other igniter will continue to be supplied.

If one igniter appears as an open circuit, the coil 87 acts as an auto-transformer to supply igniting potential to the other igniter. If one igniter appears as a short circuit, the impedance in the cable is sufficient to prevent a dead short at the transformer and the other igniter receives a substantial igniting potential.

While we have shown and described certain preferred embodiments of our invention, other modifications thereof will readily occur to those skilled in the art, and we therefore intend our invention to be limited only by the appended claims.

We claim:

1. A sensing igniter, including means defining an elongated spark gap closed at one end and open at the other, said means comprising two electrodes adjacent the closed end of the gap and adapted for electrical connection to a source of electrical energy effective at times to initiate a spark across the gap, and spark sensing means comprising a third electrode completely encircling the open end of the gap and adapted for electrical connection to current flow sensing means.

2. A sensing igniter as defined in claim 1, in which the gap defining means includes semiconductor means closing said one end of the gap.

3. A sensing igniter as defined in claim 1, in which the gap defining means includes electrical insulating means closing said one end of the gap.

4. A sensing igniter as defined in claim 1, in which the gap is annular in cross-section and the gap defining means comprises a central one of the two electrodes extending the full length of the gap, the other of the two electrodes and the third electrode being axially aligned on the periphery of the gap, and electrical insulating means separating the third electrode from the other electrode.

5. A sensing igniter comprising an elongated cylindrical shell of electrically conductive material and open at one end, a first electrode extending axially of said shell and terminating within said open end, a second electrode of hollow cylindrical form between and concentric with said first electrode and said shell and terminating inwardly of said open end, means, including first electrical insulating means, separating said first and second electrodes, second electrical insulating means separating said second electrode and said shell, said separating means, said second insulating means, said electrodes and said shell cooperating to define an elongated spark gap of annular cross-section.

6. A sensing igniter as defined in claim 5, including radially inwardly projecting flanges on the shell and the second electrode at the open end of the shell, said flanges being effective to limit the gap width to a distance less than the thickness of the electrode separating means.

7. A sensing igniter as defined in claim 5, including a radially outwardly projecting flange at the end of the first electrode adjacent the open end of the shell, said flange being effective to limit the gap width to a distance less than the thickness of the electrode separating means.

8. A sensing igniter as defined in claim 5, in which said first and second electrodes and said shell extend coaxially throughout the length of the igniter, and means at the other end of the shell adapted for attachment of a triaxial electrical connector.

9. A sensing igniter as defined in claim 8, including a triaxial connector attached to the other end, and a triaxial cable attached to the connector.

10. Ignition apparatus, comprising a source of electric energy, an igniter having two electrodes defining a spark gap and a third electrode adjacent the gap, means including two conductors connecting the respective terminals of the source to the two gap-defining electrodes, a third conductor connected to the third electrode, low impedance means connecting the third conductor to the source, and means responsive to the flow of current in the low impedance means.

11. Ignition apparatus as defined in claim 10, including an impedance connected in series between said one terminal of the source and its electrically connected gap-defining electrode.

12. Ignition apparatus as defined in claim 10, in which said current responsive means comprises a current transformer.

13. Ignition apparatus as defined in claim 12, including a secondary winding on the current transformer and a resistor connected across the terminals of the secondary winding.

14. Ignition apparatus as defined in claim 12, including a secondary winding on the current transformer, and a resistor and a capacitor connected in series across the terminals of the secondary winding, said resistor and capacitor cooperating with the secondary winding to produce at said terminals a potential varying approximately as the integral of the electromotive force induced in said winding.

15. Ignition apparatus as defined in claim 12, including a secondary winding on the current transformer, and a capacitor connected across the terminals of the secondary winding, said capacitor cooperating with the secondary winding to determine the amplitude and frequency of the potential between said terminals.

16. Ignition apparatus as defined in claim 12, including a core for the transformer having an air gap therein, said gap being effective to inhibit saturation of the transformer.

17. Ignition apparatus as defined in claim 12, in which said transformer has a closed core and a secondary winding, and a resistive load on said secondary winding having an impedance low enough to provide sufficient current flow to inhibit saturation of the transformer.

18. Electric checking apparatus, comprising a control station including a source of electric energy and electric checking means, an operating station including an electric power translating device and means for sensing energization of said device, a cable connecting said stations and including at least three coaxial conductors, means at the control station connecting the source across the two innermost of the three conductors, means at the operating station connecting the device across the two innermost conductors, means at the operating station connecting the sensing means across the two outermost of the three conductors, and low impedance means at the control station connected across the two outermost conductors, and means responsive to current flow through said low impedance means to actuate the electric checking means to indicate that the device is energized.

19. Electrical checking apparatus as defined in claim 18, in which the outermost of the three coaxial conductors is connected to ground.

References Cited in the file of this patent

UNITED STATES PATENTS

| 1,579,916 | Cushing | Apr. 6, 1926 |
| 2,496,502 | Steensma | Feb. 7, 1950 |

FOREIGN PATENTS

| 970,979 | France | July 28, 1950 |

UNITED STATES PATENT OFFICE
CERTIFICATION OF CORRECTION

Patent No. 2,963,620            December 6, 1960

Louis I. Knudson et al.

It is hereby certified that error appears in the above numbered patent requiring correction and that the said Letters Patent should read as corrected below.

In the grant only, upper right-hand corner, for the Patent Number "2,963,619" read -- 2,963,620 --; lines 1, 2 and 3, for "George H. Fathauer, of Decatur, Illinois, assignor to Thompson Ramo Wooldridge Inc., a corporation of Ohio," read -- Louis I. Knudson and John David Pfeiffer, of Norwich, New York, assignors to General Laboratory Associates, Inc., of Chenango, New York, a corporation of New York, --; line 12, for "Thompson Ramo Wooldridge Inc., its successors" read -- General Laboratory Associates, Inc., its successors --.

Signed and sealed this 30th day of May 1961.

(SEAL)
Attest:

ERNEST W. SWIDER
Attesting Officer

DAVID L. LADD
Commissioner of Patents

Disclaimer 2,963,020.—*Louis I. Knudson* and *John David Pfeiffer*, Norwich, N.Y. SENSING IGNITER. Patent dated Dec. 6, 1960. Disclaimer filed Apr. 13, 1965, by the assignee, *General Laboratory Associates, Inc.*

Hereby enters this disclaimer to claims 10, 11 and 12 of said patent.
[*Official Gazette July 27, 1965.*]